United States Patent [19]

Yamaguchi et al.

[11] 4,425,400
[45] Jan. 10, 1984

[54] MAGNETIC RECORDING MEDIUM

[75] Inventors: Nobutaka Yamaguchi; Masaaki Fujiyana; Nobuo Tsuji; Norio Nasu, all of Odawara, Japan

[73] Assignee: Fuji Photo Film Co., Ltd., Minami-ashigara, Japan

[21] Appl. No.: 364,029

[22] Filed: Mar. 31, 1982

[51] Int. Cl.³ .............................................. H01F 10/02
[52] U.S. Cl. .................................... 428/329; 428/447; 428/457; 428/688; 428/689; 428/694; 428/695; 428/698; 428/900
[58] Field of Search ................................ 427/127–132, 427/48; 428/694, 695, 900, 447, 457, 688, 689, 698, 329

[56] References Cited

U.S. PATENT DOCUMENTS 4,275,115 6/1981 Naruse ........................... 428/694 X Primary Examiner—Bernard D. Pianalto
Attorney, Agent, or Firm—Armstrong, Nikaido, Marmelstein & Kubovcik

[57] ABSTRACT

In a magnetic recording medium comprising a magnetic recording layer on the surface of a non-magnetic support member, an abrasive having a Mohs' hardness of at least 6 and needle-shaped $\alpha$-$Fe_2O_3$ are incorporated in the magnetic layer, thus improving the coating durability and decreasing the head abrasion, jitter and noise.

7 Claims, 2 Drawing Figures

MAGNETIC RECORDING MEDIUM

BACKGROUND OF THE INVENTION

1. Field of the Invention

This invention relates to a magnetic recording medium and more particularly, it is concerned with a magnetic recording medium with an improved coating durability as well as a decreased head abrasiveness, jitter and contact noise.

2. Description of the Prior Art

In order to improve the abrasion resistance of a coating in a magnetic recording medium, it has hitherto been conducted to add abrasive grains having a large Mohs' hardness to the magnetic layer, but this method has the drawback that the abrasion of a magnetic head is increased, although the durability of a coating is improved. Furthermore, in order to improve the abrasion resistance of a magnetic layer and the abrasion suppressing action of a magnetic head, there has been proposed a magnetic recording medium having a non-magnetic powder with a Mohs' hardness of at least 9 and granular $\alpha$-$Fe_2O_3$, which still shows, however, an insufficient durability of magnetic layer, much head abrasion, insufficient jitter character and in the case of a VTR using a video head of ferrite, a considerable sliding noise.

SUMMARY OF THE INVENTION

It is an object of the present invention to provide a magnetic recording medium whereby the above described drawbacks of the prior art can be overcome.

It is another object of the present invention to provide a magnetic recording medium having an improved durability of the coating film.

It is a further object of the present invention to provide a magnetic recording medium capable of giving a decreased head abrasion, jitter and contact noise.

These objects can be attained by magnetic recording medium comprising a magnetic recording layer on the surface of a non-magnetic support, in which the magnetic layer contains a ferromagnetic substance, an abrasive having a Mohs' hardness of 6 or more and acicular $\alpha$-$Fe_2O_3$.

BRIEF DESCRIPTION OF THE DRAWING

The accompanying drawings are to illustrate the principle and merits of the present invention in more detail.

DETAILED DESCRIPTION OF THE INVENTION

In accordance with the present invention, there is provided a magnetic recording medium comprising a magnetic recording layer on the surface of a non-magnetic support, characterized in that the magnetic layer contains a ferromagnetic substance, abrasive particles having a Mohs' hardness of at least 6 and acicular $\alpha$-$Fe_2O_3$.

Useful examples of the ferromagnetic substance which can be used in the present invention are, for example, $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$ ($FeO_x$: $1.33 < x < 1.50$), Co-doped Berthollide compounds of $\gamma$-$Fe_2O_3$ and $Fe_3O_4$ ($FeO_x$: $1.33 < x < 1.50$), $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973; U.S. Pat. Nos. 3,026,215, 3,031,341, 3,100,194, 3,242,005, 3,389,014, British Pat. Nos. 752,659 and 1,007,323, French Pat. No. 1,107,654 and West German PLS No. 1,281,334.

The ferromagnetic substance has a particle size of about 0.2 to 1 micron in length with a length to width ratio of about 1/1 to 20/1.

Typical abrasive agents which can be used in the present invention include fused alumina, silicon carbide, chromium oxide, corundum, synthetic corundum, diamond, synthetic diamond, garnet, emery (predominant component: corundum and magnetite) and the like, which have a Mohs' hardness of 6 or more. These abrasive agents have generally a mean particle size of about 0.05 to 5 microns, preferably 0.1 to 1 micron and can be used in a wide range of additional quantity, preferably in a proportion of 0.5 to 15% by weight to the magnetic substance. Examples of the abrasives are described in Japanese Patent Application No. 26749/1973, U.S. Pat. Nos. 3,007,807, 3,041,196, 3,293,066, 3,630,910, 3,687,725, British Pat. No. 1,145,349, and West German Pat. No. 853,211.

The acicular alpha-iron oxide used in the present invention has generally a length of 1.2 to 0.1 micron, preferably 0.8 to 0.15, more preferably 0.6 to 0.2 micron with an acicular (long axis/short axis) ratio of 15/1 to 3/1, preferably 12/1 to 4/1, more preferably 10/1 to 5/1 and is preferably used in a proportion of 5 to 30% by weight to the ferromagnetic substance. It is desirable that the acicular $\alpha$-$Fe_2O_3$ particles have a smaller thickness (short axis) than the ferromagnetic substance, i.e. acicular $\alpha$-$Fe_2O_3$/ferromagnetic substance short axis ratio=1 to 0.3.

Figure 1:
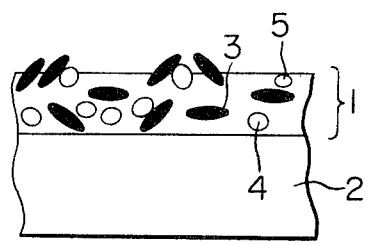
FIG. 1 is a cross-sectional view of a magnetic tape of the prior art.
Figure 2:
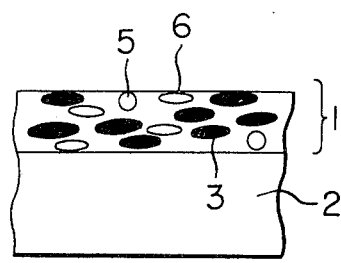
FIG. 2 is a cross-sectional view of a magnetic tape according to the present invention.

FIG. 1 is a cross-sectional view of a magnetic tape of the prior art, in which on a non-magnetic support 2 is provided a magnetic layer 1 comprising ferromagnetic substance 3, granular $\alpha$-$Fe_2O_3$ 4 and abrasive agent 5, and FIG. 2 is a cross-sectional view of a magnetic tape according to the present invention, in which on a non-magnetic support 2 is provided a magnetic layer 1 comprising a ferromagnetic substance 3, acicular $\alpha$-$Fe_2O_3$ 6 and abrasive agent 5. In the prior art magnetic tape as shown is FIG. 1, the arrangement of the acicular ferromagnetic substance in the magnetic layer is disordered by the presence of the granular $\alpha$-$Fe_2O_3$ particles 4 and a considerable roughness appears on the surface of the magnetic layer, while in the magnetic tape of the present invention as shown in FIG. 2, on the other hand, the ferromagnetic substance is arranged in good order, resulting in a smooth surface.

The magnetic recording medium of the present invention can favourably be compared with that of the prior art in surface smoothness as well as in arrangement of ferromagnetic particles in the magnetic layer and, accordingly, the following merits can be obtained according to the present invention:

(1) Head abrasion is decreased to thus lengthen the head life.

(2) Jitter is decreased.

(3) Coating durability is increased and still life is sufficient.
(4) Contact noise is decreased.
(5) Contamination is decreased in VTR running system after being used 100 times.

Production of the magnetic recording medium according to the present invention can be carried out in conventional manner by adding the above described ferromagnetic fine powder, abrasive agent having a Mohs' hardness of at least 6, acicular $\alpha$-$Fe_2O_3$ and other additives such as dispersing agents, lubricants, abrasives, antistatic agents and the like to a binder and coating solvent, blending, coating onto a non-magnetic support and then subjecting to a surface forming treatment.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, mixtures of high molecular weight polyester resins and isocyanate prepolymers, mixtures of methacrylic acid salt copolymers and diisocyanate prepolymers, mixtures of polyester polyols and polyisocyanates, urea-formaldehyde resins, mixtures of low molecular weight glycols, high molecular weight diols and triphenylmethane triisocyanates, polyamine resins and mixtures thereof. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,597,273, 3,781,210, 3,781,211, etc.

These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable luricants which can be used in the present invention include silicone oils, carbon black, graphite, carbon black graft polymers, molybdenum disulfide, tungsten disulfide, fatty acid esters produced from a monocarboxylic acid containing about 12 to 16 carbon atoms and a monohydric alcohol containing about 3 to 12 carbon atoms, fatty acid esters produced from a monocarboxylic fatty acid containing about 17 or more carbon atoms and a monohydric alcohol in which the total number of carbon atoms ranges from about 21 to 23 and the like. These lubricants are generally used in a proportion of about 0.2 to 20 parts by weight per 100 parts by weight of a binder. These lubricants are described in Japanese Patent Publication No. 23889/1968, Japanese Patent Application Nos. 28647/1967 and 81543/1968, U.S. Pat. Nos. 3,470,021, 3,492,235, 3,497,411, 3,523,086, 3,625,760, 3,630,772, 3,634,253, 3,642,539 and 3,687,725, IBM Technical Disclosure Bulletin, Vol. 9, No. 7, page 779 (December 1966), and ELECTRONIK, No. 12, page 380 (1961), West Germany.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as higher alkylamines, quaternary ammonium salts, heterocyclic compounds, e.g. pyridine and the like; phosphoniums, sulfoniums and the like; anionic surface active agents containing acid groups such as carboxylic acid groups, sulfonic acid groups, phosphoric acid groups, sulfate groups, phosphate groups and the like; and amphoteric surface active agents such as sulfates or phosphates of amino acids, aminosulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to sono Oyo" (Synthesis of Surface Active Agents and Their Applications), Maki Shoten, Tokyo (1964), A. M. Schwarts et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran" (Handbook of Surface Active Agents), 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving the dispersibility, magnetic properties and lubricity, or as an auxiliary coating agent.

Formation of a magnetic recording layer is carried out by dissolving the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc., and non-magnetic metals, for example, copper, aluminum, zinc, etc.

Such a non-magnetic support has a thickness of about 3 to 100 microns, preferably 5 to 50 microns in the form of a film or sheet and a thickness of about 0.5 to 10 microns in the form of a disk or card. In the case of a drum form, its type is determined according to a recorder to be used.

The above described magnetic powder, binder, additives and solvent are well blended or kneaded to prepare a magnetic coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition.

Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in "Coating Kogaku" (Coating Engineering), page 253 to 277, published by Asakura Shoten, Tokyo (Mar. 20, 1971).

Typical organic solvents which can be used in the coating include ketones such as acetone, methyl ethyle ketone, methyl isobutyl ketone, cyclohexanone and the like; alcohols such as methanol, ethanol, propanol, butanol and the like; esters such as methyl acetate, ethyl acetate, butyl acetate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene, and the like; chlorinated hydrocarbons such as methylene chloride, ethylene chloride, carbon tetrachloride, chloroform, ethylene chlorohydrin, dichlorobenzene and the like; etc.

The present invention will be explained in detail with reference to the following examples. It will be obvious to one skilled in the art that various changes and modifications can be made in components, ratios, operational order and the like without departing from the spirit of the present invention. Therefore, the present invention should not be construed as being limited to the following examples.

EXAMPLES

A coating liquor having the following composition was prepared, coated onto a polyethylene terephthalate base having a thickness of 20 microns, subjected to a surface finishing treatment and then slit to obtain a magnetic tape of ¾ inch in width for U-matic VTR. The various properties were assessed by a U-matic VTR.

| | |
|---|---|
| Co-doped $\gamma$-$Fe_2O_3$ (particle: long axis 0.9 micron, short axis 0.15 micron) | 100 parts by weight |
| Vinyl Chloride-Vinyl Acetate-Vinyl Alcohol Copolymer | 8 |
| Synthetic Rubber (Nitrile-Butadiene Rubber) | 12 |
| Polyisocyanate | 8 |
| Carbon Black | 5 |
| Lecithin | 0.5 |
| Abrasive $Cr_2O_3$ | A |
| Acicular $\alpha$-$Fe_2O_3$ | B |
| Methyl Ethyl Ketone | 120 |
| Cyclohexanone | 120 |
| Oleic Acid (manufactured by Kanto Kagaku Co.) | C |
| Silicone Oil (KF-96-1,000,000 CS, manufactured by Shinetsu Kagaku Co.) | D |

The results are shown in the following table:

TABLE

| Example | Abrasive $Cr_2O_3$ A | Acicular $\alpha$-$Fe_2O_3$ B | Thickness Ratio of Acicular $\alpha$-$Fe_2O_3$/ Magnetic Substance | Oleic Acid/ Silicone Oil | Head Abrasion at 5° C. ($\mu$m/100 hr) | Jitter (relative assessment) | Still Life at 5° C. (min) | Contact Noise (relative assessment) |
|---|---|---|---|---|---|---|---|---|
| 1 | 5 | 15 | 0.8 | 1/0.2 | 2 | little | 120< | little |
| 2 | 5 | 15 | 0.8 | 0/0 | 3.5 | medium | 100 | little |
| 3* | 5 | 0 | 0.8 | 1/0.2 | 4 | little | 120< | medium |
| 4* | 5 | 0 | 0.8 | 0/0 | 5 | medium | 90 | medium |

TABLE-continued

| Example | Abrasive Cr$_2$O$_3$ A | Acicular α-Fe$_2$O$_3$ B | Thickness Ratio of Acicular α-Fe$_2$O$_3$/ Magnetic Substance | Oleic Acid/ Silicone Oil | Head Abrasion at 5° C. (μm/100 hr) | Jitter (relative assessment) | Still Life at 5° C. (min) | Contact Noise (relative assessment) |
|---|---|---|---|---|---|---|---|---|
| 5* | 0 | 15 | 0.8 | 1/0.2 | 1>** | little | 1> | medium |
| 6* | 0 | 15 | 0.8 | 0/0 | 1>** | medium | 1> | medium |
| 7* | 0 | 0 | 0.8 | 1/0.2 | 1>** | little | 1> | much |
| 8* | 0 | 0 | 0.8 | 0/0 | 1>* | medium | 1> | much |
| 9 | 5 | 15 | 1.3 | 1/0.2 | 3.5 | medium | 120< | medium or somewhat much |
| 10 | 5 | 15 | 1 | 1/0.2 | 2.5 | little | 120< | little |
| 1 | 5 | 15 | 0.8 | 1/0.2 | 2 | little | 120< | little |
| 11 | 5 | 15 | 0.5 | 1/0.2 | 2 | little | 120< | little |
| 12 | 5 | 15 | 0.3 | 1/0.2 | 1.5 | little | 120< | little |
| 13 | 5 | 15 | 0.1 | 1/0.2 | 1.5 | little | 60 | little |
| 14* | 5 | granular α-Fe$_2$O$_3$ | 0.5μ, 15 | 0/0 | 15<** | much | 30 | much |
| 15* | 5 | granular α-Fe$_2$O$_3$ | 0.3μ, 15 | 0/0 | 10 | much | 5 | much |
| 16* | 5 | granular α-Fe$_2$O$_3$ | 0.1μ, 15 | 0/0 | 3 | medium | 1> | little |
| 17* | ZnO 5  4–5*** | B = 15 | 0.8 | 1/0.2 | 1.5** | little | 20 | little |
| 18 | MgO 5  6*** | 15 | 0.8 | 1/0.2 | 2 | little | 90< | little |
| 19 | α-Al$_2$O$_3$ 5  9*** | 15 | 0.8 | 1/0.2 | 2 | little | 120< | little |
| 20 | SiC 5  9.5*** | 15 | 0.8 | 1/0.2 | 3 | little | 120< | little |
| 1 | Cr$_2$O$_3$ 5  8–9*** | 15 | 0.8 | 1/0.2 | 2 | little | 120< | little |
| 21 | 13 | 7 | 0.8 | 1/0.2 | 3.5 | little | 120< | little |
| 22 | 3 | 20 | 0.8 | 1/0.2 | 1.5 | little | 120< | little |

Note
*Comparative Example
**Contamination or adhesion of brown magnetic scraped powder in VTR system after running 100 times
***Mohs' hardness As is evident from Sample Nos. 1 to 8, Sample Nos. 1 and 2 show a little head abrasion, excellent jitter property, long still life even at a low temperature and small contact noise, all the characteristics being well balanced. In comparison of Sample Nos. 1 and 2, Sample No. 1 containing a fatty acid and silicone oil is more excellent in head abrasion adn jitter.

It will be understood from comparison of Sample Nos. 1 and 9 to 13 that the above described characters are all good when the thickness ratio of acicular α-Fe$_2$O$_3$ and magnetic substance particles is within a range of 1 to 0.3.

It will be understood from comparison of Sample Nos. 17 to 20 and 1 that when the Mohs' hardness is within a range of 4 to 5, the still life is shorter and the durability is not good, while when 6 or more, there can be obtained a practically sufficient still life.

Sample Nos. 14 to 16 are comparative examples using granular α-Fe$_2$O$_3$ instead of acicular α-Fe$_2$O$_3$ and inferior in all characters to those of the present invention.

The similar advantages were obtained even when using acicular goethite α-FeOOH instead of acicular α-Fe$_2$O$_3$.

What is claimed is:

1. A magnetic recording medium comprising a magnetic recording layer on the surface of a non-magnetic support, the magnetic recording layer comprising a ferromagnetic substance, 0.5-15 wt % based on the weight of the ferromagnetic substance of an abrasive having a Mohs' hardness of at least 6 and 5-30 wt % based on the weight of the ferromagnetic substance of acicular α-Fe$_2$O$_3$ having a length of 1.5 to 0.1 micron.

2. The magnetic recording medium of claim 1, wherein the ferromagnetic substance is selected from the group consisting of fine powders of γ-Fe$_2$O$_3$, Co-doped γ-Fe$_2$O$_3$, Fe$_3$O$_4$, Co-doped Fe$_3$O$_4$, Berthollide compounds of γ-Fe$_2$O$_3$ and Fe$_3$O$_4$, Co-doped Berthollide compounds of γ-Fe$_2$O$_3$ and Fe$_3$O$_4$, CrO$_2$, Co-Ni-P alloys, Co-Ni-Fe alloys, Co-Ni-Fe-B alloys, Fe-Ni-Zn, alloys, Fe-Mn-Zn alloys, Fe-Co-Ni-P alloys and Ni-Co alloys.

3. The magnetic recording medium of claim 1, wherein the abrasive having a Mohs' hardness of at least 6 is selected from the group consisting of fused alumina, silicon carbide, chromium oxide, corundum, synthetic corundum, diamond, synthetic diamond, garnet and emery.

4. The magnetic recording medium of claim 1, wherein the acicular α-Fe$_2$O$_3$ has an acicular ratio (long axis/short axis) of 15/1 to 3/1.

5. The magnetic recording medium of claim 1, wherein the thickness (short axis) of the acicular α-Fe$_2$O$_3$ is smaller than that of the ferromagnetic substance.

6. The magnetic recording medium of claim 5, wherein the acicular α-Fe$_2$O$_3$/ferromagnetic substance ratio (short axis ratio) is 1 to 0.3.

7. The magnetic recording medium of claim 1, wherein the magnetic recording layer further contains a fatty acid and silicone oil.

* * * * *

UNITED STATES PATENT AND TRADEMARK OFFICE
CERTIFICATE OF CORRECTION

PATENT NO. : 4,425,400
DATED : January 10, 1984
INVENTOR(S) : YAMAGUCHI ET AL

It is certified that error appears in the above-identified patent and that said Letters Patent is hereby corrected as shown below:

On the title page the following should be added:

-- [30] Foreign Application Priority Data
    March 31, 1981  [JP]  Japan........56/46447--.

Signed and Sealed this

Twelfth Day of June 1984

[SEAL]

Attest:

GERALD J. MOSSINGHOFF

Attesting Officer

Commissioner of Patents and Trademarks